United States Patent [19]

Sergel et al.

[11] Patent Number: 5,078,819
[45] Date of Patent: Jan. 7, 1992

[54] METHOD AND APPARATUS FOR PRODUCING A GREEN TIRE ON A CURVING APPARATUS

[75] Inventors: Horst Sergel, Hanover; Horst Golombek, Ronnenberg; Friedrich Bartsch, Neustadt, all of Fed. Rep. of Germany

[73] Assignee: Continental Aktiengesellschaft, Hanover, Fed. Rep. of Germany

[21] Appl. No.: 558,686

[22] Filed: Jul. 27, 1990

[30] Foreign Application Priority Data

Jul. 28, 1989 [DE] Fed. Rep. of Germany ....... 3925083

[51] Int. Cl.⁵ .................................................. B29D 30/58
[52] U.S. Cl. .................................... 156/126; 156/131; 156/135; 156/398; 156/407; 156/415; 156/420
[58] Field of Search ...................... 156/110.1, 126, 131, 156/135, 398, 403, 406.2, 407, 414, 415, 416, 417, 418, 419, 420

[56] References Cited

U.S. PATENT DOCUMENTS 3,171,769  3/1965  Henley et al. ...................... 156/416
3,493,454  2/1970  Cooper et al. ..................... 156/415

Primary Examiner—Michael W. Ball
Assistant Examiner—Francis J. Lorin
Attorney, Agent, or Firm—Robert W. Becker & Associates

[57] ABSTRACT

A method and apparatus for producing a green tire on a curving apparatus that includes a fixing head system having two rotatable and axially movable, one-piece bead-holding disks are provided. The bead-holding disks are swiveled about an axis perpendicular to their axis of rotation. The essentially cylindrical carcass member is disposed on the bead-holding disks concentric to their axis of rotation. The bead-holding disks are subsequently swiveled back into a position vertical to their axis of rotation. After the carcass is fixed on the disks, it is curved into a belt unit.

9 Claims, 3 Drawing Sheets

FIG—1

METHOD AND APPARATUS FOR PRODUCING A GREEN TIRE ON A CURVING APPARATUS

BACKGROUND OF THE INVENTION

The present invention relates to a method and apparatus for producing a tire blank or green tire on a curving apparatus that includes a fixing head system having two rotatable and axially movable, one-piece bead-holding disks.

During the production of a green tire within the framework of a two-stage manufacture, a tire carcass is first wrapped upon a winding drum and is provided with the bead cores and core profile. The cylindrical carcass member that is produced in this manner is subsequently provided with a toroidal shape on a curving apparatus and is thereby connected with the belt unit.

With heretofore known methods for producing green tires, the prefabricated carcass member is temporarily stored and is subsequently manually placed upon the curving apparatus. Essentially two types of curving apparatus are known. With a first type, grooved or hooked fixing heads are provided that are equipped with segmented bead-holding disks. The segments can be drawn together to such an extent that it is just possible to place the carcass on the apparatus. Unfortunately, such an apparatus has the drawback that it is very expensive to manufacture and operate the segments. Furthermore, gaps between the segments result in marks on the green tire.

With the other known type of curving apparatus, fixing heads having one-piece, rigid, axially movable disks are provided. This apparatus has the drawback that the carcass must be manually and forcibly placed upon the apparatus, and in particular at an angle to the bead-holding disks. Furthermore, the holding disks must be moved very close together in order to make it possible to mount the carcass member. This necessitates long paths of travel for the disks and hence a greater expenditure of time for the curving process.

It is therefore an object of the present invention to provide a method that permits an automatic placement of the carcass, and also provides an apparatus where the means for accommodating the carcass have a simple construction and are as sturdy as possible.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The method of the present invention is characterized primarily by the steps of: swiveling the bead-holding disks about an axis perpendicular to their axis of rotation; disposing an essentially cylindrical carcass member onto the bead-holding disks concentric to the axis of rotation of the disks; subsequently swiveling the bead-holding disks back into a position perpendicular to the axis of rotation; fixing the carcass on the bead-holding disks; and curving the carcass into a belt unit.

The apparatus of the present invention for carrying out the inventive method is characterized primarily in that each of the circular bead-holding disks is mounted on a shaft in such a way as to be pivotable perpendicular to its axis of rotation.

The present invention enable a simple automatic introduction of the carcass member. Temporary storage of the carcass member can be eliminated. In contrast to the heretofore known apparatus, shorter paths of travel for the holding disks are provided, thus resulting in a saving of time during curving of the green tire. The basic concept of the present invention is that in order to provide a simple placement of the essentially cylindrical carcass member on the bead-holding disks, the disks are swiveled about axes perpendicular to their axis of rotation, and the carcass member is then disposed upon the disks concentric to their axis of rotation. By swiveling the bead-holding disks, their surface of projection is reduced, so that the carcass member, which during introduction is slightly ovally deformed in one direction, can move over the bead-holding disks without difficulty. This is possible even where the bead-holding disks are disposed relatively far apart. Thus, to fix the carcass after the bead-holding disks have been swiveled back, it is merely necessary to move the disks slightly further apart, thus leading to a not inconsiderable saving in time during the curving process.

Further specific features of the present invention will described in detail subsequently.

DESCRIPTION OF PREFERRED EMBODIMENTS

Figure 1:
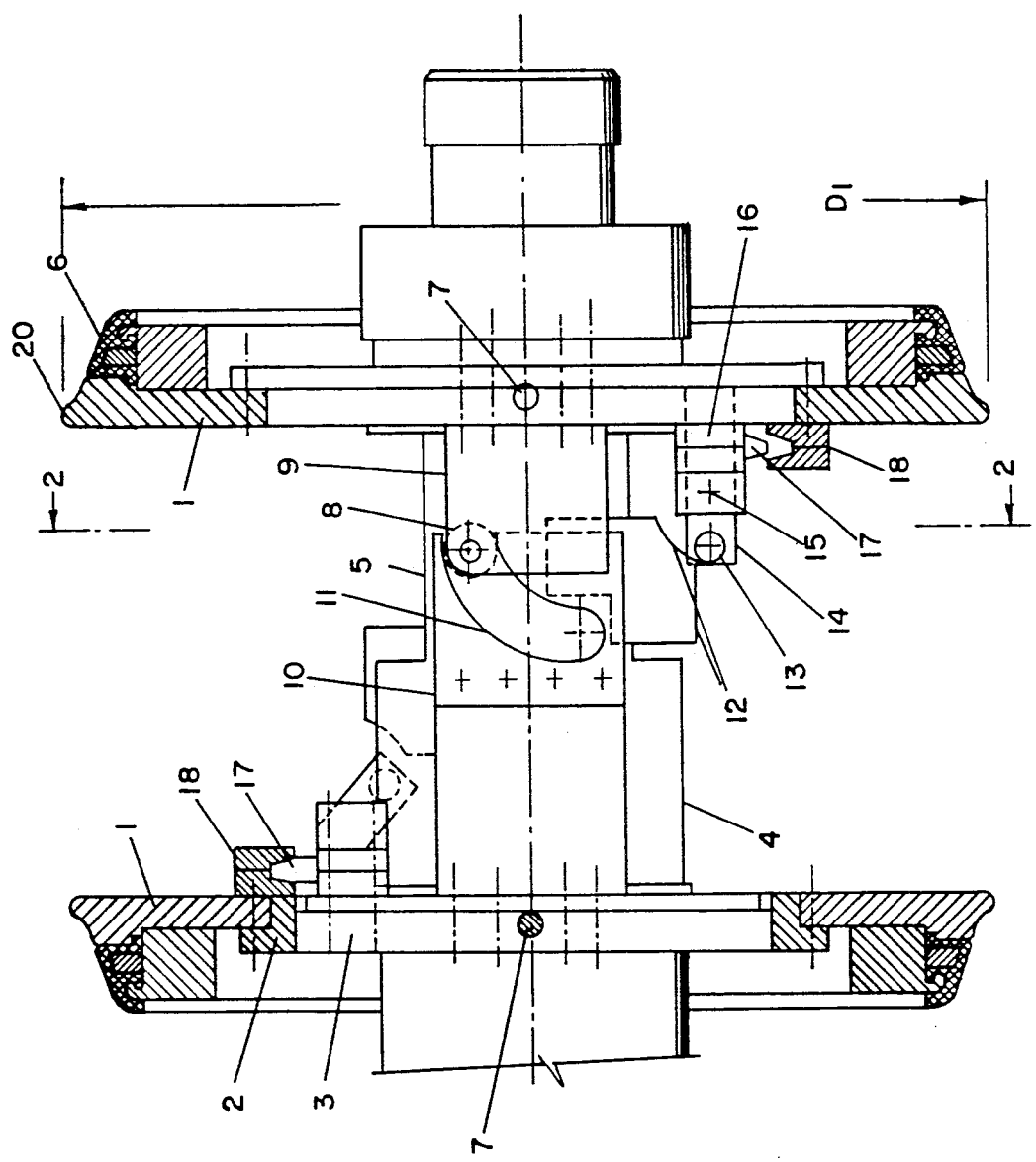
FIG. 1 is a side view of one exemplary embodiment of the inventive apparatus showing a fixing head system having two pivotable bead-holding disks, which are shown in cross section.
Figure 2:
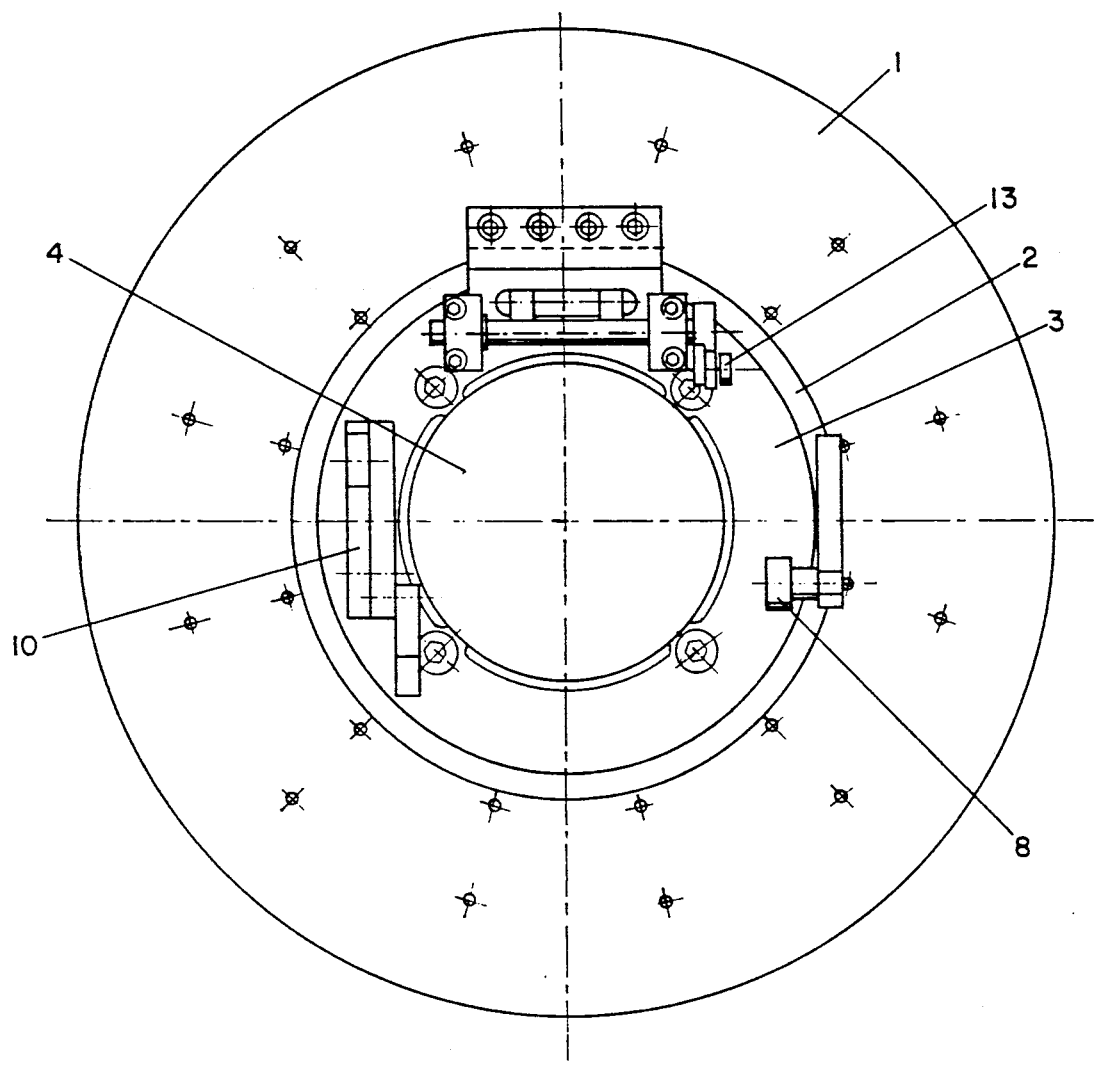
FIG. 2 is a sectional view taken along the line 2—2 in FIG. 1.

Referring now to the drawings in detail, the apparatus illustrated in FIG. 1 for curving a carcass into a belt unit shows a fixing head system having two one-piece bead-holding disks 1. These bead-holding disks 1 are disposed on two swivel disks 2. The swivel disks 2 are pivotably mounted on two fixed disks 3 that are secured on two fixed disks 3 that are secured on two arbors 4, 5 that can be concentrically moved relative to one another. On its radially and axially outer periphery, each of the bead-holding disks 1 carries an inflatable retaining bellows 6 for fixing the beads of the blank or green tire. In order to be able to produce green tires that have varying dimensions the bead-holding disks 1 are exchangeably mounted on the swivel disks 2, which are each pivotable about a respective shaft 7 relative to the fixed disks 3. On that side that faces the other disk, each bead-holding disk 1 is provided with a cam or guide roller 8 that is secured to the respective bead-holding disk 1 via a flange 9. Disposed at the level of the guide roller 8 is a swivel plate 10 that has a swivel curve 11 and that is secured to the opposite fixed disk 3. Also provided on each swivel plate 10 is a locking cam 12 that controls a locking roller 13. The rollers 13 are disposed on respective lever arms 14 that are mounted on a shaft 15 that in turn is mounted on a flange 16 that is connected with the fixed disk 3. When the guide roller 8 enters the linear portion of the swivel curve 11, the locking roller 13 comes into operative contact with the locking cam 12, whereby the shaft 15 is turned, thereby releasing a locking wedge 17 between the fixed disk 3 and a locking flange 18 on the bead-holding disk 1.

Figure 3:
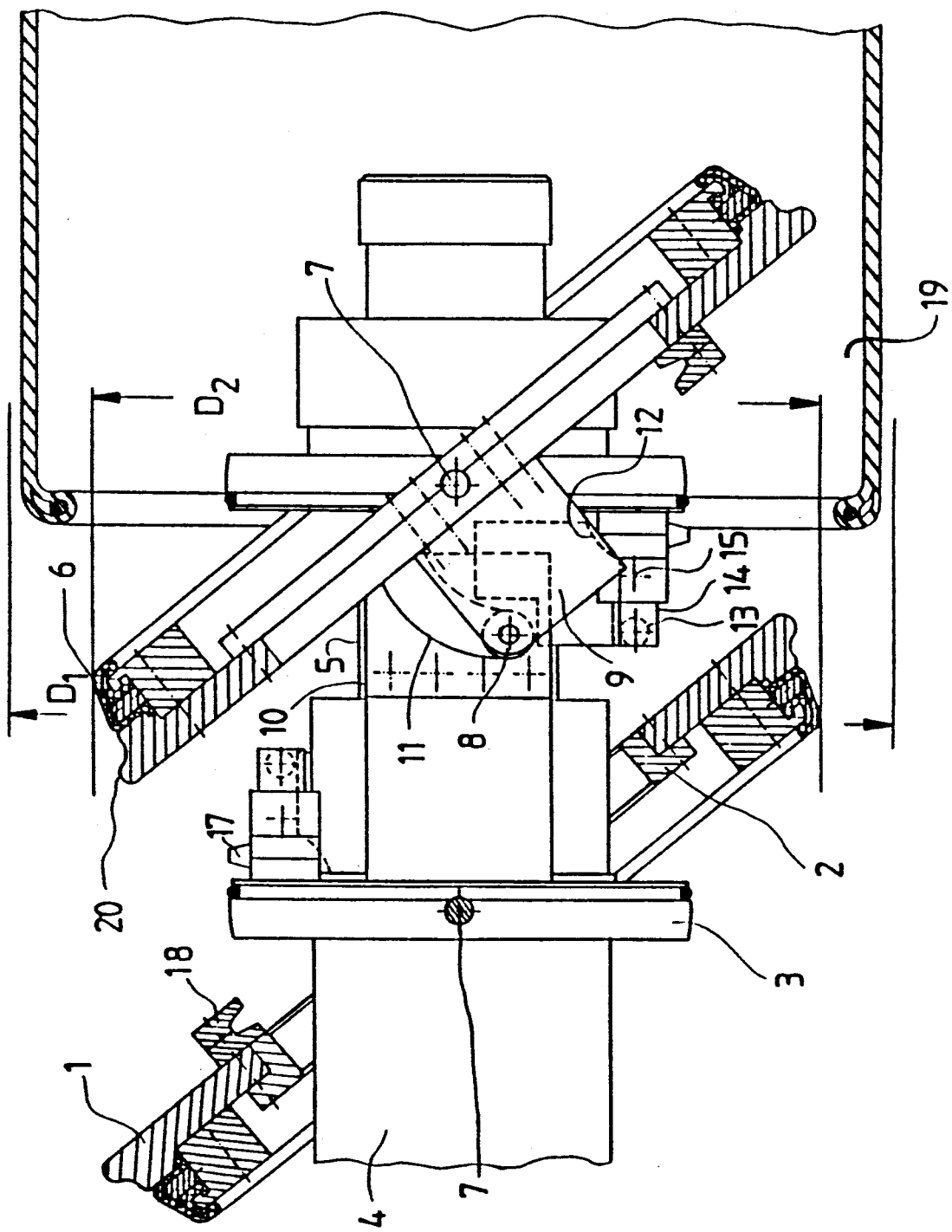
FIG. 3 shows the apparatus of FIG. 1, but with the bead-holding disks being swiveled.

The method of the present invention will now be described. For this discussion, the starting position is shown in FIG. 1. In this position, the apparatus is in the axially moved-together state of the bead-holding disks 1 and the disks are not swiveled. To provide the apparatus with a wrapped carcass, the two bead-holding disks 1 are swiveled into their end position. This is effected by moving the two disks 1 relative to one another. In so doing, the guide rollers 8 enter the swivel curves 11 and the locking rollers 13 approach the locking cams 12. At a certain point during the course of this movement, the locking rollers 13 come into engagement with the locking cams 12 and ensure a release of the locking wedges 17 between the fixed disks 3 and the bead-holding disks 1. After the release, the guide rollers 8 continue their movement in the swivel curves 11, and the bead-holding disks 1 swivel about an angle of approximately 45° into their end position (FIG. 3). The loading position has now been achieved. In this position, instead of the diameter $D_1$ of the bead-holding disks (FIG. 1), only the diameter $D_2$ of the surface of projection (short axis of an oval) is now operative.

In a position perpendicular to the arbors 4 and 5, a carcass 19, in an oval pressed-together state in the bead region, is moved over the free end of the apparatus and or the pivoted bead-holding disks 1. In this connection, the long axis of the oval in the bead region extends parallel to the shafts 7. Subsequently, the carcass 19 is returned from the oval state to the round state, and is held in this state via known means. Thereafter, the bead-holding disks 1 execute a pivoting movement in the opposite direction until the disks 1 have again achieved their starting position and are locked. The bead-holding disks 1 are subsequently moved further axially apart into the so-called expanded state, where the beads of the carcass 19 are taken hold of by the flanges 20 of the bead-holding disks 1 and the carcass 19 is stretched and hence centered and fixed.

The holding mechanism for the carcass 19 is subsequently removed. The conventional curving process is thereafter effected, whereby in a known manner the carcass 19 is inflated with compressed air and the bead-holding disks 1 along with the beads that are fixed thereon, are moved together. In so doing, the carcass 19 is curved into the non-illustrated belt unit. Prior to reaching the direction-reversing point of the axial force in the fixation region of the beads, the retaining bellows 6 are expanded in order to prevent the beads from flying off. The curving process is subsequently concluded, so that in the end state the finished green tire is produced. The retaining bellows 6 are thereupon contracted. A conventional mechanism grasps the green tire from the outside. The two bead-holding disks 1 are subsequently again moved axially together, whereupon the previously described swivel mechanism is used. After the end position is reached, the green tire is withdrawn via the known mechanism over the two bead-holding disks 1, and a vulcanization apparatus is introduced. In the swiveled state of the bead-holding disks 1, the entire process is repeated by applying the next carcass 19 in the manner described.

It is to be understood that the described pivoting of the bead-holding disks 1 could, of course, also be effected with other control means in addition to using guide rollers and swivel plates. The drive means for the individual movement processes can function in a pneumatic or some other manner. The means for supplying compressed air to the retaining bellows 6 and the carcass 19 have not been described in detail since they can be embodied in a manner known per se.

The present invention is, of course, in no way restricted to the specific disclosure of the specification and drawings, but also encompasses any modifications within the scope of the appended claims.

What we claim is:

1. A method of producing a green tire on a curving apparatus that includes a fixing head system having two rotatable and axially movable, one-piece bead-holding disks, said method including the steps of:

swiveling said bead-holding disks out of a plane that is perpendicular to a longitudinal axis of said curving apparatus about an axis perpendicular to said longitudinal axis;

disposing an essentially cylindrical carcass member onto said bead-holding disks concentric to said longitudinal axis of said curving apparatus swiveling said bead-holding disks back into said plane perpendicular to said longitudinal axis of said curving apparatus;

fastening said carcass member on said bead-holding disks; and shaping said carcass member into a toroid.

2. A method according to claim 1, in which said swiveling steps include swiveling said bead-holding disks by about 45° relative to said plane perpendicular to said longitudinal axis.

3. A method according to claim 1, which includes the step of ovally deforming said carcass member during said step of disposing said carcass member onto said swiveled bead-holding disks.

4. An apparatus for producing a green tire on a curving apparatus that includes a fixing head system having two rotatable and axially movable, one-piece beadholding disks, said apparatus comprising:

said bead-holding disks that are circular and are each mounted on a shaft in such a way as to be pivotable out of a plane that is perpendicular to a longitudinal axis of said curving apparatus about an axis perpendicular to said longitudinal axis.

5. An apparatus according to claim 4, in which said shafts for said two bead-holding disks extend parallel to one another.

6. An apparatus according to claim 4, in which said bead-holding disks are pivotable out of said plane that is perpendicular to a longitudinal axis of said curving apparatus about a pivot angle of approximately 45°.

7. An apparatus according to claim 4, in which, to enable switching to different tire dimensions, said bead-holding disks are detachably secured to swivel disks that in turn are disposed in an airtight manner on fixed disks that are secured on arbors, with said swivel disks being pivotable relative to said fixed disks.

8. An apparatus according to claim 7, in which each one of said fixed disks is provided with a swivel plate having a swivel curve and a guide roller, whereby said guide roller of a first one of said fixed disks engages said swivel curve of a second one of said fixed disks and said guide roller of said second fixed disk engages said swivel curve of said first fixed disk.

9. An apparatus according to claim 7, which includes means for locking said swivel disks in a position thereof perpendicular to said longitudinal axis of said curving apparatus.

* * * * *